Dec. 8, 1964  A. C. HOWELL, JR  3,160,267
CONVEYOR APPARATUS AND CONVEYOR CHAIN THEREFOR
Filed Oct. 27, 1961  2 Sheets-Sheet 1

INVENTOR.
ALLEYNE C. HOWELL, JR.
BY
ATTORNEY.

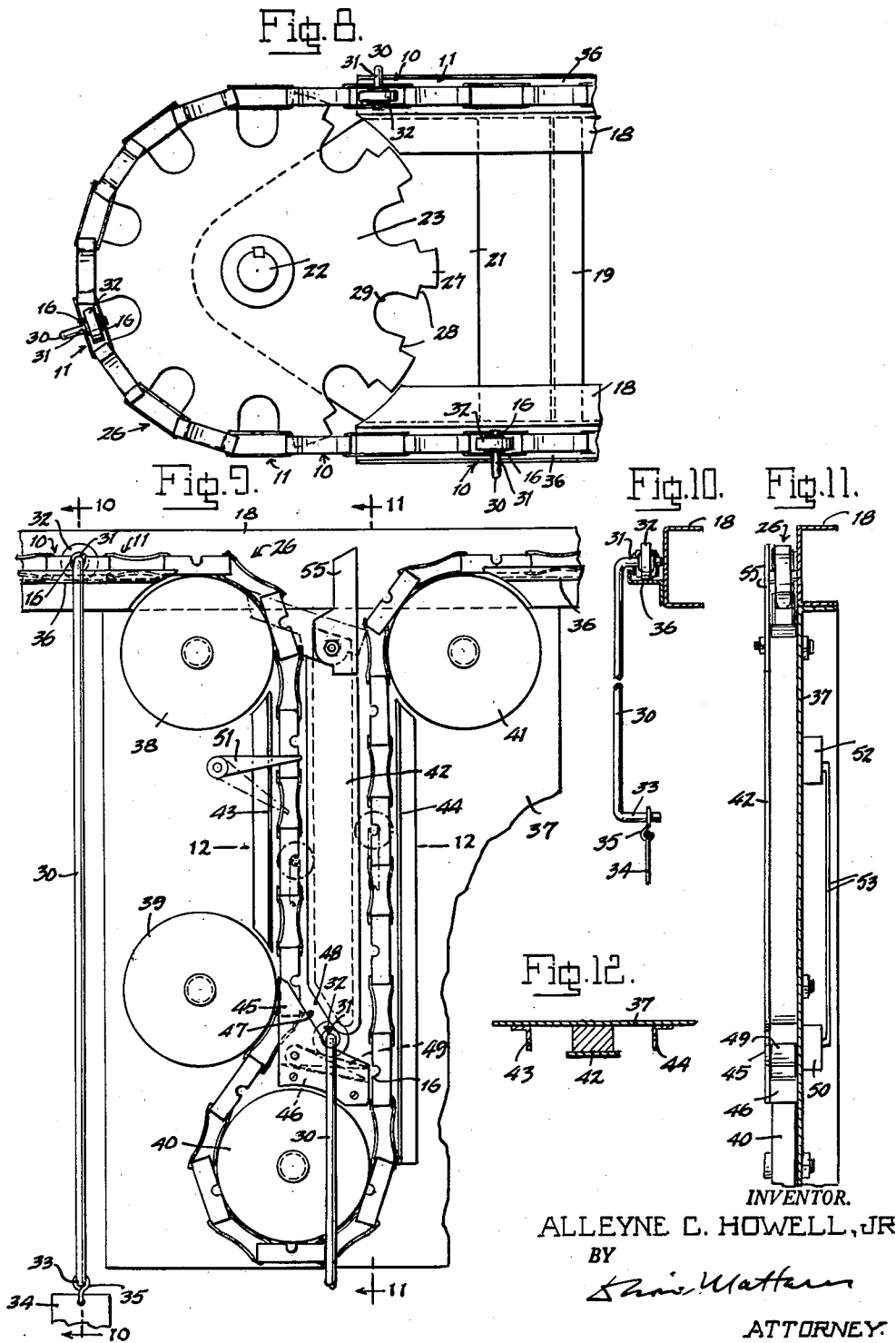

United States Patent Office 3,160,267
Patented Dec. 8, 1964

3,160,267
CONVEYOR APPARATUS AND CONVEYOR
CHAIN THEREFOR
Alleyne C. Howell, Jr., 645 Mine Hill Road,
Fairfield, Conn.
Filed Oct. 27, 1961, Ser. No. 148,156
8 Claims. (Cl. 198—189)

The present invention relates to a conveyor apparatus and conveyor chain therefor, particularly for use in the carrying of articles through successive processing stations as for instance plating, coating, cleaning, etc., wherein the individual stations may involve differential timing differential movement of the articles, and other varying factors.

An object of the invention is to provide an improved conveyor chain of simple and inexpensive construction conveniently formed of metal strip or bar stock bent to shape, which is free of pins, rivets and other similar connection means, and is capable of free articulation in two directions for movement about both horizontal and vertical gears or rollers. Another object is to provide a chain comprising a series of connected loop links comprising alternate contoured and straight links, the contoured links adapted to conform to rollers of predetermined radius and the straight links adapted to engage the rollers in tangential relation and to have relative pivotal movement about fixed axes with respect to the contoured links. A further object is to provide a chain in which the alternate straight links are adapted to have article carriers connected thereto in such manner that they may be readily engaged or removed either manually or automatically.

Another object is to provide a conveyor apparatus which in cooperation with the chain of the invention permits the article carriers to be removed from the chain during timed intervals and thereupon re-engaged, whereby the articles may remain in relation to selected stations of the apparatus, as for instance a plating tank, for such timed intervals without interruption in the movement of the chain. A further object is to provide a conveyor apparatus which in cooperation with the chain of the invention permits the article carriers to be transferred from a main conveyor chain to an auxiliary conveyor chain having a differential movement, as for instance a relatively slow or fast speed, and thereupon re-engaged with the main conveyor chain, thus enabling the articles to move in relation to a selected station of the apparatus, for instance through a plating tank, at a relatively slow or fast speed compared to the speed of the main conveyor chain. Another object is to provide a conveyor apparatus including means whereby the article carriers may be caused to by-pass selected stations.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 8 is a plan view on an enlarged scale of the drive gear end portion of the conveyor apparatus as seen in FIG. 1;

FIG. 9 is a side elevation on an enlarged scale of the first station of the conveyor apparatus as seen in FIG. 1;

FIG. 10 is a vertical sectional view taken along the line 10—10 of FIG. 9;

FIG. 11 is a vertical sectional view taken along the line 11—11 of FIG. 9; and

FIG. 12 is a horizontal sectional view taken along the line 12—12 of FIG. 9.

Figure 1:
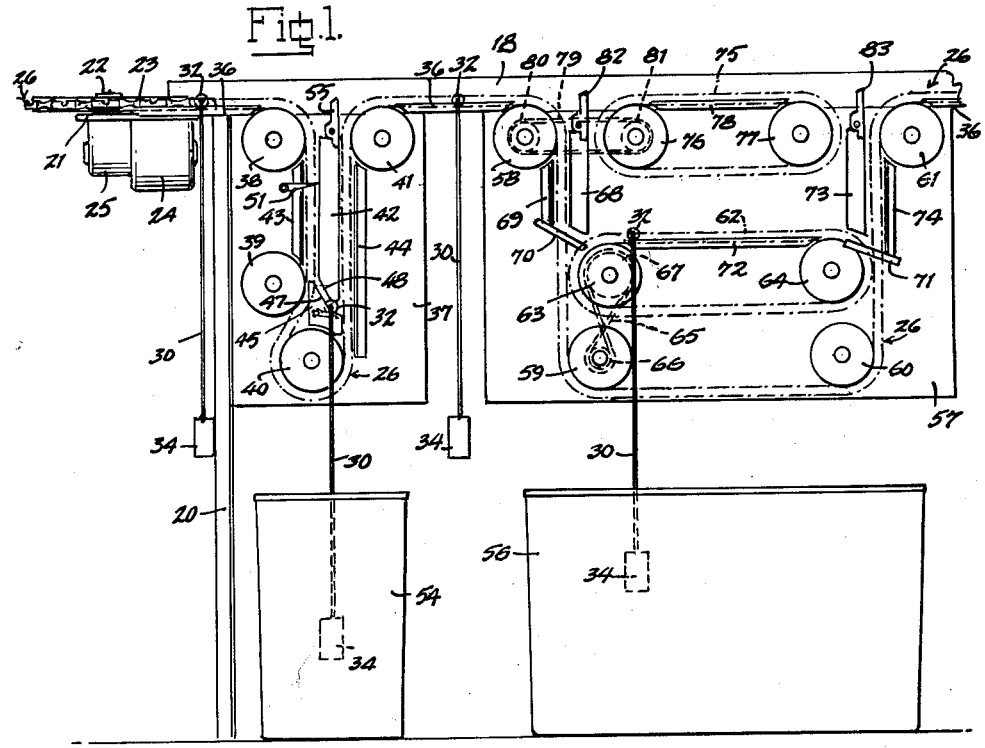
FIG. 1 is a side elevation of one end portion of a conveyor apparatus according to the invention.
Figure 2:
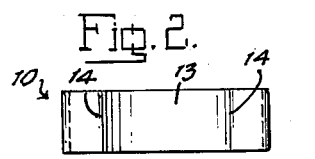
FIG. 2 is a plan view of one of the contoured links of the conveyor chain according to the invention.
Figure 3:
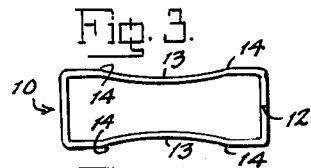
FIG. 3 is a side elevation thereof.
Figure 4:
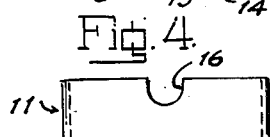
FIG. 4 is a side elevation of one of the straight links of the conveyor chain according to the invention.

Referring to the drawings and more particularly to FIGS. 2–7, the conveyor chain according to the exemplary embodiment of the invention illustrated therein comprises interengaged alternate contoured links 10 and straight links 11, the contoured links 10 as seen in separated relation in FIGS. 2 and 3 each comprising a length of strip or bar stock bent into the form of a loop of generally rectangular shape with its ends meeting along the medial line of one of the rectangular planar ends, as at 12, where it may if desired be welded following assembly of the chain. The opposed side walls are inwardly curved at 13—13 with the ends of the curved portions inwardly spaced from the ends of the link to provide parallel side wall portions at each end of the link and longitudinally spaced land points 14—14 at the ends of the curved portions for engagement with the periphery of a guide roller, as will presently more fully appear.

The straight link 11 are each similarly formed of strip or bar stock bent to shape to provide a loop of generally rectangular shape with its ends meeting along the medial line of one of the rectangular ends, as at 15, where it may if desired be welded following assembly of the links in the chain. Centrally of the upper edges of the opposed straight side walls there are provided notches 16—16 for receiving and retaining the article carriers, as will hereinafter more fully appear.

Figure 6:
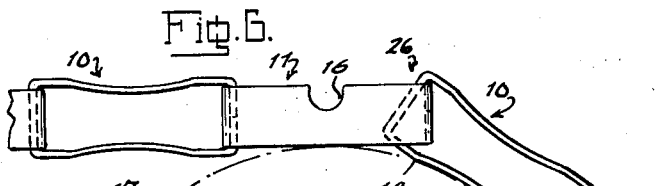
FIG. 6 is a side elevation of a section of the conveyor chain with a portion thereof in its position for movement about a vertically disposed roller.
Figure 7:
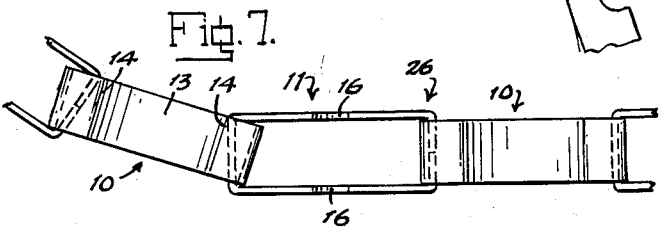
FIG. 7 is a plan view of a section of the conveyor chain according to the invention with a portion thereof shown in its position for movement about a horizontally disposed gear or roller.
Figure 5:
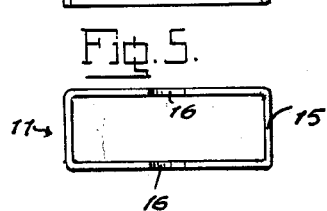
FIG. 5 is a plan view thereof.

The width of the strip or bar stock for both the links 10 and 11 is the same and the inside width dimension of each link substantially corresponds to the width of the stock, so that in the connected relation of the links, as seen in FIGS. 6 and 7, the straight links have their rectangular ends engaged with the rectangular ends of the contoured links. Thus, in the horizontal position of the chain as seen in FIG. 6 the inter-engagement of the links is such that they support each other against relative vertical displacement. As seen in FIG. 7 the links are adapted to have horizontal articulation with an edge of the rectangular end of the contoured link 10 pivotally moving in one corner of the straight link 11. As seen in FIG. 6, a portion of the chain is articulated as it moves about the periphery of a guide roller, indicated by the dot-and-dash line 17, the radius of the periphery preferably corresponding to the radius of curvature of the curved portions 13 of the contoured links, so that in the engaged relation of the contoured link, with its land points 14—14 both in contact with the peripheral surface, the adjacent straight link 11 will have its lower straight edge in tangential engagement with the periphery, and the pivot axes of articulation will be at fixed points in the outer corners of the contoured links outwardly removed from the periphery. Thus, despite the increase in the spacing between the side walls of the contoured links and the ends of the straight links the latter will, by virtue of its tangentially engaged relation with the periphery of the roller, be retained in a substantially fixed relation against inward shifting movement, the longitudinal center lines of both the contoured and the straight links being maintained at the same radial distance as they move about the roller.

While the radius of curvature of the curved portions 13 preferably corresponds to the radius curvature of the periphery of the roller, it is pointed out that the same relationship can also be obtained by providing the curved portions 13 of smaller radius, or by providing other suitable indented shapes, the essential relationship being that the land points 14—14 will engage the roller in the predetermined relationship to allow the lower edges of the straight links 11 to engage the periphery of the roller in tangential relation while maintaining their articulation axes fixed in the corners of the contoured links. The restriction of the intermediate portions of the contoured links provided by their curved portions also functions to limit longitudinal movement of the ends of the straight links within the contoured links, thus preventing tangling or jamming of the chain when it is in a loose or piled up state apart from the conveyor apparatus.

The conveyor apparatus according to the invention is illustrated by way of example as a plating apparatus in which articles to be plated are moved into and out of a succession of processing tanks, and comprises a frame consisting of a pair of horizontal spaced parallel channel beams 18—18 supported at suitable intervals upon vertical angle iron uprights 20. At each end of the horizontal channel beams 18 there is secured a horizontal plate 21 which supports upon a vertical shaft 22 a horizontal gear 23. Only the gear at one end of the apparatus is shown, it being understood that the other gear is identical. The gear at one end is driven by a motor 24 mounted beneath the plate 21 and connected to the vertical shaft 22 by suitable reduction gearing disposed within the reduction gear housing portion 25 of the motor.

The continuous conveyor chain, indicated generally as 26, and comprising the connected links 10 and 11, is carried about the gears 23 at each end of the apparatus, and intermediate these gears moves horizontally between a succession of processing stations arranged along one or both sides of the apparatus, and at each station its path is diverted downwardly to cause the articles to be dipped into and out of a series of tanks. In the illustrated example two such stations are shown, at one of which the article carrier is adapted to be separated from the conveyor chain, so that the article may remain in a stationary position within the tank for a predetermined time interval whereupon the carrier is again connected to the conveyor chain. At the other station it is adapted to be transferred to a differential speed auxiliary conveyor chain which causes the article to be moved through the tank of a different speed, for instance a slower speed, than the speed of the main conveyor chain whereupon the article carrier is again connected to the main conveyor chain. It will be understood that the stations may be of any desired number and arrangement designed to carry out any particular succession of processing steps.

The gear 23 is provided with a series of teeth 27 between which there are provided pockets 28 of corresponding length at their bases to the straight links 11, the width of the teeth 27 being such that they will enter the openings of the contoured links 10 when the latter are articulated by pivotal movement in the outer corners of the adjacent straight links 11. Thus the chain is engaged about the gear without looseness between the links and is positively driven by virtue of the fitting engagement of the straight links 11 in the pockets 28. Clearance recess 29 extend inwardly from the bases of the pockets 28, for a purpose presently to more fully appear.

The article carriers comprise a rod 30 provided at its upper end with a right-angularly extended shaft portion 31 upon which a roller 32 is rotatably engaged intermediate the ends of the shaft portion, and which is adapted to be received in the opening of the straight links 11 with the shaft portion 31 engaged within the notches 16 in the sides of the link, the diameter of the roller being such that it extends below the plane of the lower side of the chain in the horizontal position of the latter for rolling support upon a horizontal guide, as will presently more fully appear. At the lower end of the rod 30 there is provided a right-angularly extended finger portion 33 upon which an article 34 to be processed is adapted to be supported, as for instance by a hook 35, the center of gravity of the article being substantially in vertical line with the roller so that the carrier when supported through rolling contact of the roller 36 with a horizontal guide will remain in a substantially vertical position. As the article carriers move about the gear 23 the recesses 29 provide clearance for the ends of the shaft portions 31, and also permit the rod 30 to be disposed inwardly of the conveyor chain when the apparatus is suitably arranged for this purpose.

Horizontal trackway guides 36 in the form of flanged shelves are secured at suitable intervals along the outer sides of the channel beams 18 which guide the conveyor chain horizontally as it moves between the processing stations where the chain is diverted downwardly to dip the articles into the tank related to each station. As the article carriers are propelled along the trackway guides by the chain, the carrier rollers 32 are in direct rolling contact with the guides so that the vertical load of the articles is not imposed on the chain.

The first station, illustrated by way of example and shown in detail in FIGS. 9–12, comprises a panel 37 secured to and depending from the channel beam 18 and upon which there are rotatably mounted a first idler roller 38 about which the chain moves from the first horizontal guide 36 into a vertical position, a second idler roller 39 disposed in spaced relation below the idler roller 38 and engaged at the outer side of the chain, a third idler roller 40 about which the chain is looped, and a fourth idler roller 41 in horizontal line with and spaced from the first idler roller 38 and about which the chain moves to the second horizontal guide 36. The arrangement is such that the chain moves vertically downward between the first and second rollers 38 and 39, around the third roller 40, and then vertically upward between the third and fourth rollers 40 and 41, the downwardly and upwardly moving vertical traverses of the chain being in spaced parallel relation to each other. In the space between the vertical traverses of the chain there is provided a flanged roller guide 42, which as shown by the dot-and-dash lines in FIG. 9 retains the carrier rollers in engagement with the notches 16 of the vertically moving chain. At the outer sides of the vertical traverses of the chain there are provided angle iron chain guides 43 and 44.

The diameter of the idler rollers is predetermined with respect to the radius of curvature of the curved portions 13 of the contoured links 10, so that the links of the chain engage the peripheries of the rollers in the manner as illustrated in FIG. 6, the articulation of the links taking place at the fixed axis points in the outer corners of the contoured links. In this manner the links of the chain are held against looseness both longitudinally an transversely.

At the lower end of the downward vertical traverse of the chain there is provided a cam plate 45 mounted upon a block member 46 secured to the panel 37, and which is adapted to engage the shaft portion 31 of the article carrier between the outer sides of the chain and the rod 30 to cause the carrier to be disengaged laterally from the notches 16 of the chain. For this purpose the cam plate is provided with a downwardly inclined edge 47 in spaced parallel relation to an inclined lower end 48 of the flanged roller guide 42, and which provides an inclined slot through which the shaft portion 31 of the carrier moves by gravity. A pivoted latch lever 49 is provided at the inner sides of the cam plate 45 and in its raised position as seen in FIG. 9 it cooperates with the lower end of the roller guide 42 to stop the movement of the carrier roller 32 at a point between the downwardly and upwardly moving vertical traverses of the chain.

The latch lever 49 is controlled by a suitable timer mechanism 50 to cause it to move between its latching and releasing positions, and the timer mechanism is adapted to be started by a starting lever 51 disposed in the path of the shaft portion 31 of the carrier rod 30 at a point in the downward vertical traverse of the chain above the cam plate 45. The starting lever is connected to a mechanism 52, suitably connected as by electrical relay connections 53 with the timer mechanism 50, so that upon actuation of the lever 51 the timer mechanism is started to time the interval that the latch lever 49 remains in latching position, the latch lever moving to its releasing position as shown by the dot-and-dash lines at the end of such interval.

In operation a carrier moves from the horizontal guide 36 about the idler roller 38 in a vertical downward direction, causing the article 34 to be dipped into the tank 54, and at the same time causing the starting lever 51 to be moved from the full line to the dot-and-dash line position as seen in FIG. 9 to start the timer 50, whereupon it is moved laterally from the chain by the cam plate 47 where the raised latch lever 49 retains it for the predetermined timed interval. At the end of this interval the timer causes the latch lever to move to the lowered dot-and-dash line position indicated in FIG. 9, and allows the carrier roller 32 to move by gravity into engagement with the upwardly moving vertical traverse of the chain, the carrier roller moving into the opening of one of the straight links 11 and the shaft portion 31 moving into the notches 16, whereupon the carrier moves vertically upward to raise the article out of the tank. The carrier thereupon moves about the idler roller 41 and is carried along the second horizontal chain guide 36 to the second processing station.

At the upper end of the roller guide 42 there is pivotally mounted a by-pass lever 55 which may be manually moved to the dot-and-dash line position as seen in FIG. 9, to cause the carriers to by-pass the first station, if desired. This lever in its operative position has its inclined upper edge disposed in the path of the shaft portion 31 of the carrier as it moves downwardly about the first idler roller 38, thus causing the carrier to be lifted out of the conveyor chain whereupon it moves by gravity to the upwardly moving portion of the conveyor chain carried about the idler roller 41 where it is picked up by the chain and carried along the second horizontal chain guide 36.

The second processing station shown by way of example is one where the dipped article is caused to be moved by an auxiliary conveyor chain through a tank 56 at a different speed from that of the main conveyor chain. It comprises a panel 57 secured to and depending from the channel beam 18 upon which there are mounted first, second, third and fourth idler rollers 58, 59, 60 and 61, the main conveyor chain moving vertically downward between the rollers 58 and 59, horizontally between the rollers 59 and 60, and vertically upward between the rollers 60 and 61. A continuous auxiliary conveyor chain 62 is mounted upon rollers 63 and 64 respectively adjacent the downward and upward vertical traverses of the main conveyor chain, the auxiliary chain being driven at a different speed from the main conveyor chain, as by a crossed drive belt 65 extended about pulleys 66 and 67 carried by the rollers 59 and 63. In the illustrated example the auxiliary conveyor chain is shown as being driven at a slower speed than the main conveyor chain, and thus the diameter of the pulley 67 is greater than the diameter of the pulley 66. A vertical roller guide 68 and a vertical chain guide 69 are provided at each side adjacent the downward vertical traverse of the main conveyor chain and at their lower ends there is provided an inclined switch bar 70 disposed in the path of the shaft portion 31 of the carrier and extending from the downward vertical traverse of the main conveyor chain to the left hand end of the upper traverse of the auxiliary conveyor chain 62. The carrier is thus caused to be transferred from the main conveyor chain to the auxiliary chain following the lowering of the article into the tank 56, the article then moving horizontally through the tank 56 at the differential speed of the conveyor chain 62. As the carrier reaches the right hand end of the upper traverse of the auxiliary conveyor chain its shaft portion 31 engages an inclined switch bar 71 causing it to be transferred from the auxiliary conveyor chain to the upwardly moving vertical traverse of the main conveyor chain which raises the article from the tank and carries the article carrier about the roller 61 to the third horizontal chain guide 36, from which it moves to other stations as will be understood. A flanged chain guide 72 similar to the trackway guides 36 is secured to the panel 57 at the lower side of the upper traverse of the auxiliary chain 62. A roller guide 73 and a chain guide 74 are provided at the respective sides of the upwardly moving vertical traverse of the chain.

In order to by-pass the second station a second continuous auxiliary conveyor chain 75 is engaged about rollers 76 and 77 mounted upon the panel 57 in horizontal line with the rollers 58 and 61, a trackway guide 78 being provided at the under side of its upper traverse. The auxiliary chain 75 is adapted to be driven at the same speed as the main conveyor chain and for this purpose a belt 79 is engaged about equal size pulleys 80 and 81 provided upon the shafts of the rollers 58 and 76. Pivoted by-pass levers 82 and 83, similar to the by-pass lever 55, are provided at the upper ends of the roller guides 68 and 72 and are adapted when manually moved into their operative positions, similar to the dot-and-dash line position of the by-pass lever 55 as seen in FIG. 9, to cause the article carriers to move directly from the main conveyor chain to the auxiliary conveyor chain 75 and from the latter back again to the main conveyor chain.

What is claimed is:

1. In a conveyor apparatus, an endless conveyor chain comprising a first series of links alternating with a second series of links and connected for articulation in two directions, one direction being at right angles to the other direction, rotary drive means about which said chain engages through articulation in said one direction, rotary roller means having its axis of rotation at right angles to the axis of rotation of said rotary drive means and about which said chain engages through articulation in said other direction, said links of said first series each being in the form of a four-sided loop having rectangular end walls and top and bottom walls, and said links of said second series each being in the form of a four-sided loop having rectangular end walls and side walls, the end walls of the links of said first series being engaged at their inner sides with the inner sides of the end walls of said links of said second series, said top and bottom walls of each of said links of said first series being indented to provide spaced land points equally spaced from its end walls for engagement with the periphery of said roller means at each side of a radius line thereof intersecting the center point of said link, and the side walls of each of said links of said second series having straight edges for engagement with the periphery of said roller tangentially of a radius line intersecting the center point of said link.

2. The invention as defined in claim 1, wherein the indentations of said top and bottom walls are each curved upon a radius substantially corresponding to the radius of said roller means.

3. In a conveyor apparatus, an endless conveyor chain comprising a first series of links alternating with a second series of links and connected for articulation in two directions, one direction being at right angles to the other direction, rotary drive means about which said chain engages through articulation in said one direction, rotary roller means having its axis of rotation at right angles to the axis of rotation of said rotary drive means and about which said chain engages through articulation in said other direction, said links of said first series each being in the form of a four-sided loop having rectangular end walls and top and bottom walls, and said links of said second series each being in the form of a four-sided loop having rectangular end walls and side walls, the end walls of the links of said first series being engaged at their inner sides with the inner sides of the end walls of said links of said second series, said top and bottom walls of each of said links of said first series being indented to provide spaced land points equally spaced from its end walls for engagement with the periphery of said roller means at each side of a radius line thereof intersecting the center point of said link, and the side walls of each of said links of said second series having straight edges for engagement with the periphery of said roller tangentially of a radius line intersecting the center point of said link, said side walls having laterally opposed centrally disposed notches opening to their upper edges, and article carrier means comprising a suspension member having a horizontally extended shaft portion pivotally engageable in said notches, and a roller on said shaft portion adapted to be received in the opening of said link between said side walls.

4. In a conveyor apparatus, an endless conveyor chain comprising a first series of links alternating with a second series of links and connected for articulation in two directions, one direction being at right angles to the other direction, rotary drive means about which said chain engages through articulation in said one direction, rotary roller means having its axis of rotation at right angles to the axis of rotation of said rotary drive means and about which said chain engages through articulation in said other direction, said links of said first series each being in the form of a four-sided loop having rectangular end walls and top and bottom walls, and said links of said second series each being in the form of a four-sided loop having rectangular end walls and side walls, the end walls of the links of said first series being engaged at their inner sides with the inner sides of the end walls of said links of said second series, article carrier means comprising a suspension member and means for pivotally engaging said suspension member with a link of said second series, means for guiding said chain along a horizontal path, means for guiding said chain in a diverted path wherein said chain has downward and upward traverses out of and into said horizontal path, cam means for transferring said article carrier from said downward traverse to said upward traverse, and timer means for arresting the transfer movement of said carrier for a predetermined period at a point between said downward and upward traverses.

5. In a conveyor apparatus, an endless conveyor chain comprising a first series of links alternating with a second series of links and connected for articulation in two directions, one direction being at right angles to the other direction, rotary drive means about which said chain engages through articulation in said one direction, rotary roller means having its axis of rotation at right angles to the axis of rotation of said rotary drive means and about which said chain engages through articulation in said other direction, said links of said first series each being in the form of a four-sided loop having rectangular end walls and top and bottom walls, and said links of said second series each being in the form of a four-sided loop having rectangular end walls and side walls, the end walls of the links of said first series being engaged at their inner sides with the inner sides of the end walls of said links of said second series, article carrier means comprising a suspension member and means for pivotally engaging said suspension member with a link of said second series, means for guiding said chain along a horizontal path, means for guiding said chain in a diverted path wherein said chain has downward and upward traverses out of and into said horizontal path, an auxiliary endless conveyor chain arranged between said downward and upward traverses, and having a horizontal traverse, and cam means for transferring said article carrier from said downward traverse to said horizontal traverse of said auxiliary chain and therefrom to said upward traverse.

6. In a conveyor apparatus, an endless conveyor chain comprising a first series of links alternating with a second series of links and connected for articulation in two directions, one direction being at right angles to the other direction, rotary means about which said chain engages through articulation in said one direction, other rotary means having its axis of rotation at right angles to the axis of rotation of said rotary drive means and about which said chain engages through articulation in said other direction, a horizontal trackway means above which said chain moves in its transition between said rotary means, said links of said first series each being in the form of a four-sided loop having end walls and top and bottom walls, and said links of said second series each being in the form of a four-sided loop having end walls and vertical side walls, the end walls of the links of said first series being engaged at their inner sides with the inner sides of the end walls of said links of said second series, said vertical side walls of said links of said second series have laterally opposed vertical notches opening to their upper edges, and article carrier means comprising a substantially vertically extending suspension member having a horizontally extended shaft portion engaged for vertical movement in said notches and removable therefrom through their open ends, and a roller on said shaft portion adapted to be received in the opening of said link between its side walls, the diameter of said roller being such that it projects below the side walls of the link in which it is received and has rolling engagement with said trackway whereby a vertical load imposed upon said suspension member is supported upon said trackway without imposing vertical load upon said link.

7. A conveyor chain comprising a first series of links alternating with a second series of links and connected for articulation in two directions, one direction being at right angles to the other direction, said links each being in the form of a four-sided loop having a pair of equal size planar rectangular end walls, each having two parallel free edges, and a pair of side walls extending between said pair of end walls connected to the other two parallel edges of each end wall and forming angle corners with the inner sides of said end walls, said end walls of both said first and second series of links being of equal size and the inside width dimension of each end wall between its two parallel free edges substantially corresponding to the width dimension between its other two parallel edges, the end walls of the links of one series having their inner sides disposed at the inner sides of the end walls of the links of the other series with the free edges of each end wall normally engaged in the angle corners of the adjacent end of an adjacent link, the angle of each said angle corner being at least 90°, whereby upon relative angular movement of adjacent links one free edge of an end wall of one of said adjacent links has pivotal movement in the angle corner normally engaged thereby and the other free edge of said one end wall has free movement out of the angle corner normally engaged thereby.

8. The conveyor chain as defined in claim 7, wherein the side walls of said links of said first series are indented to provide spaced land points equally spaced from its end walls for engagement with the periphery of roller means at each side of a radius line thereof intersecting the center point of said link, and the side walls of each of said links of said second series having straight edges for engagement with the periphery of said roller means tangentially to a radius line intersecting the center point of said link.

References Cited in the file of this patent

UNITED STATES PATENTS

| | | |
|---|---|---|
| 393,490 | Stone | Nov. 27, 1888 |
| 993,313 | Merz | May 23, 1911 |

FOREIGN PATENTS

| | | |
|---|---|---|
| 572,604 | Great Britain | Oct. 16, 1945 |
| 1,136,147 | France | Dec. 22, 1956 |